United States Patent [19]

Sawanobori et al.

[11] Patent Number: 4,895,890
[45] Date of Patent: Jan. 23, 1990

[54] CALCIUM SILICATE SHAPED PRODUCT

[75] Inventors: Takeo Sawanobori, Kawasaki; Mitsuru Awata, Kodaira; Noriyuki Ariyama, Hino; Yuji Noguchi, Yokohama, all of Japan

[73] Assignee: Mitsubishi Chemical Industries Limited, Tokyo, Japan

[21] Appl. No.: 332,380

[22] Filed: Apr. 3, 1989

Related U.S. Application Data

[63] Continuation of Ser. No. 105,284, Oct. 7, 1987, abandoned.

[30] Foreign Application Priority Data

Oct. 14, 1986 [JP] Japan ................................. 61-243722
Oct. 14, 1986 [JP] Japan ................................. 61-243724

[51] Int. Cl.$^4$ ........................... C08K 7/06; C08K 3/34
[52] U.S. Cl. ................................. 524/456; 524/495; 524/556
[58] Field of Search ................ 524/456, 495, 556, 559

[56] References Cited

U.S. PATENT DOCUMENTS

| | | | |
|---|---|---|---|
| 3,978,180 | 8/1976 | Ueda et al. | 264/42 |
| 4,132,555 | 1/1979 | Barrable | 106/90 |
| 4,152,308 | 5/1979 | Edwards | 524/400 |
| 4,490,505 | 12/1984 | Pendergrass | 524/556 |
| 4,603,157 | 7/1986 | Asai | 524/495 |

FOREIGN PATENT DOCUMENTS

| | | | |
|---|---|---|---|
| 3711549 | 10/1987 | Fed. Rep. of Germany | |
| 246251 | 12/1985 | Japan | 524/456 |

Primary Examiner—John C. Bleutge
Assistant Examiner—David Buttner
Attorney, Agent, or Firm—Oblon, Spivak, McClelland, Maier & Neustadt

[57] ABSTRACT

A calcium silicate shaped product comprising a calcium silicate hydrate, a carboxyl group-containing copolymer latex, a coupling agent and a carbon fiber.

8 Claims, No Drawings

CALCIUM SILICATE SHAPED PRODUCT

This application is a continuation of application Ser. No. 105,284, filed on Oct. 7, 1987 now abandoned.

The present invention relates to a calcium silicate shaped product which has a light weight and excellent flexural strength as well as excellent non-flammability, heat resistance and water resistance and which is thus suitable as a building material such a synthetic wood material.

Conventional synthetic wood materials are composed essentially of a synthetic resin such as polystyrene, polypropylene or polyurethane. Therefore, they have drawbacks such that when heated at a high temperature, they readily undergo deformation or lead to smoking or burning.

Various attempts or proposals have been made in order to overcome such drawbacks. For example, there have been proposed a method wherein when an inorganic filler such as calcium carbonate or gypsum is added to the synthetic resin, the proportion of the filler is increased, a method wherein a calcium silicate hydrate is incorporated to the synthetic resin, a method wherein calcium silicate is used as the main material, a reinforcing fiber is added and dispersed thereto, followed by pressfilter molding by a filterpress, and drying, a method wherein a resin is impregnated to the above molded plate of calcium silicate, and a method wherein calcium silicate is used as the main material, and a carboxyl group-containing styrene-butadiene copolymer latex, a cationic polymer flocculating agent and a reinforcing fiber are added and dispersed thereto, followed by molding and drying (Japanese Unexamined Patent Publication No. 246251/1985).

However, the method of incorporating an inorganic filler such as calcium carbonate or calcium silicate hydrate to the synthetic resin, has drawbacks such that the bulk specific gravity of the molded product thereby obtained is high, and if it is attempted to bring the bulk specific gravity to a level of a natural wood material, the strength of the molded product substantially deteriorates. In the method wherein a reinforcing fiber is added and dispersed in calcium silicate, followed by press filter molding by a filter press, the hygroscopicity will be high due to the fine porous structure of calcium silicate, whereby it is impossible to obtain processability at a level of a natural wood material. Further, in the method of impregnating a resin to a calcium silicate shaped plate, a substantial amount of a resin is required, and the heat resistance deteriorates substantially, although the processability may be improved. On the other hand, the molded product disclosed in Japanese Unexamined Patent Publication No. 246251/1985 is improved with respect to these drawbacks, but the flexural strength of the molded product is substantially lower than that of a natural wood material. Therefore, it has a drawback that the application is extremely limited.

The present inventors have conducted extensive research to overcome such problems, and have found it possible to overcome the problems by mixing a calcium silicate hydrate, a carboxyl group-containing copolymer latex, a coupling agent and a carbon fiber, followed by molding. The present invention has been accomplished on the basis of this discovery.

Namely, it is an object of the present invention to provide a calcium silicate shaped product which has a light weight and excellent flexor strength as well as excellent non-flammability, heat resistance and water resistance.

The present invention provides a calcium silicate shaped product comprising a calcium silicate hydrate, a carboxyl group-containing copolymer latex, a coupling agent and a carbon fiber.

The calcium silicate shaped product can be obtained by molding an aqueous slurry comprising a calcium silicate hydrate, a carboxyl group-containing copolymer latex, a coupling agent, a carbon fiber and water, followed by drying or by steam curing and drying Now, the present invention will be described in detail with reference to the preferred embodiments.

The calcium silicate hydrate to be used in the present invention can be obtained, for example, by subjecting a calcareous source such as quick lime and a siliceous source such as ground quartzite to a hydrothermal synthetic reaction. It is usually possible to obtain a wide range of materials ranging from a crystalline material so-called xonotlite or tobermorite to CSH I and CSH II or to amorphous materials. As a method for its preparation, it is possible to employ a method wherein an aqueous slurry having a calcareous source and a siliceous source adjusted to bring the molar ratio of CaO and $SiO_2$ to a substantially equal level, is reacted under pressure at an elevated temperature of at least 160° C. In the present invention, this slurry can be used as it is. However, it is also possible to use a powder obtained by drying the slurry by adding water thereto. There is no particular restriction as to the concentration of the solid content of the calcium silicate hydrate in the slurry. However, the concentration of solid content is preferably at most 10%, more preferably from 3 to 8% in view of the productivity.

As the copolymer constituting the main component of the carboxyl group-containing copolymer latex to be used in the present invention, it is possible to employ a styrene-butadiene copolymer, an acrylonitrile-butadiene copolymer or an acrylic acid ester copolymer such as a copolymer of methyl methacrylate with an acrylic acid ester. The latex can be prepared by adding during the preparation of such a copolymer by usual emulsion polymerization a carboxyl group-containing unsaturated compound such as acrylic acid, methacrylic acid, itaconic acid, fumaric acid, crotonic or maleic acid in an amount of from 0.2 to 20 parts by weight, preferably from 0.2 to 15 parts by weight, relative to 100 parts by weight of the total amount of the monomers for the main component, and conducting three-component copolymerization.

For example, a carboxyl group-containing styrene-butadiene copolymer latex can be produced by polymerizing butadiene, styrene and the above-mentioned carboxyl group-containing unsaturated compound by usual emulsion polymerization. For this polymerization, the molar ratio of the monomers is adjusted to be styrene : butadiene = 4 to 8 : 6 to 2, and the amount of the carboxyl group-containing unsaturated compound is adjusted within the above-mentioned range relative to 100 parts by weight of the total amount of styrene and butadiene monomers. If the amount of the carboxyl group-containing unsaturated compound is too small, the flexural strength of the shaped product tends to be low. On the other hand, if the amount is excessive, there will be a problem such as an increase of the cost.

Further, for the purpose of improving the flexural strength of the calcium silicate shaped product, it is effective to add during the preparation of the above latex an unsaturated compound having a functional group cross-linkable with a carboxyl group in addition to the carboxyl group-containing unsaturated compound.

The type of the functional group cross-linkable with a carboxyl group and the unsaturated compound containing such a functional group may be, for example, as follows:

(1) An epoxide group-containing glycidyl acrylate, glycidyl methacrylate or ally glycidyl ether, (2) A hydroxyl group-containing allyl alcohol, 2-hydroxyethyl methacrylate or 2-hydroxypropyl acrylate, (3) An N-methylol group-containing N-methylol acrylamide or N-methylol methacrylamide, or its ether, (4) An isocyanate group-containing vinyl isocyanate or ally isocyanate.

The self-curing copolymer latex can be obtained by adding at least one type of such functional group-containing unsaturated compound in an amount substantially equal to the carboxyl group-containing compound and conducting four-component or more than four multi-component copolymerization.

The amount of the above latex is usually from 2 to 25 parts by weight, preferably from 2 to 10 parts by weight, as solid content, relative to 100 parts by weight of the calcium silicate hydrate. If the amount is increased beyond this range, there will be problems such as a decrease in the non-flammability, an increase in the bulk specific gravity and an increase in the cost, although the strength of the shaped product increases.

As the coupling agent, for instance, a silane coupling agent, a titanate coupling agent, an aluminum coupling agent, a chromium coupling agent, a zirconate coupling agent or a zircoaluminate coupling agent may be employed. From the viewpoint of the availability, economy and convenience in handling, it is preferred to employ a silane coupling agent or a titanate coupling agent.

The silane coupling agent may be represented by the formula:

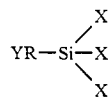

and the titanate coupling agent may be represented by the formula $(RO)_m—TiOX—R—Y)_n$ wherein X is an alkoxy group or a halogen atom, and Y is an organic functional group.

Specific examples of the silane coupling agent include vinyl triethoxysilane, methacryloxypropyl trimethoxysilane, aminopropyl trimethoxysilane, epoxycyclohexylethyl trimethoxysilane, glycideoxypropyl trimethoxysilane and mercaptopropyl trimethoxysilane.

Likewise, specific examples of the titanate coupling agent include isopropyl tri(dioctylphosphate) titanate, isopropyl tri(dioctylpyrophosphate) titanate, titanium di(dioctylphosphate) oxyacetate, di(dioctylphosphate) ethylene titanate, tetraisopropyl di(dioctylphosphite) titanate and isopropyl triisostearoyl titanate.

The coupling agent is added preferably in an amount of from 0.3 to 5 parts by weight relative to 100 parts by weight of the calcium silicate hydrate.

If the amount of the coupling agent is too small, no adequate proportion or strengthening of the adhesion of the calcium silicate and the copolymer can be attained.

On the other hand, if the amount is excessive, there will be problems such that unreacted alkoxy functional groups remain, and the cost increases.

For the production of the shaped product of the present invention, firstly the calcium silicate hydrate, the copolymer latex and the coupling agent are uniformly mixed to obtain an aqueous slurry. At that time, a polymer flocculating agent for a polymer emulsion, such as polyacrylamide, may be added.

There is no particular restriction as to the carbon fiber to be used in the present invention, and any conventional carbon fiber may be employed. For example, carbon fibers prepared from coal tar pitch, petroleum pitch, liquefied product of coal, polyacrylonitrile, cellulose and polyvinyl alcohol, may be employed.

It is particularly preferred to employ a carbon fiber having a tensile strength of at least 150 kg/mm$^2$ and a tensile modulus of elasticity of at least 5 ton/mm$^2$, whereby the flexor strength of the resulting calcium silicate product will be high.

Among them, a carbon fiber prepared from a pitch having an optically anisotropic phase, i.e. a mesophase pitch type carbon fiber, is superior in the tensile strength and in the tensile modulus of elasticity to an isotropic pitch type carbon fiber prepared from a pitch having an optically isotropic phase, and the mesophase pitch type carbon fiber is preferred since it is possible to obtain a shaped product having high strength and rigidity.

The amount of the reinforcing carbon fiber is usually 1-30% by weight in the shaped product, preferably from 1 to 15 parts by weight relative to 100 parts by weight of the calcium silicate hydrate. The larger the amount, the higher the flexor strength of the shaped product. However, if the amount is excessive, the fiber tends to be hardly dispersed and is likely to aggregate, whereby the strength will be impaired. Further, there will be a problem such that the water filtration property and moldability tend to be poor.

The slurry of the mixture thus obtained is subjected to the removal of water by means of e.g. filter press, then molded under pressing and dried, or steam curing and dried to obtain a shaped product.

As the molding method, it is possible to employ a conventional molding method such as press molding, filter press molding, extrusion molding or vacuum molding. The drying after the molding is conducted usually at a temperature of from 100 to 180° C., preferably from 105 to 150° C. The drying is continued usually for from 5 to 15 hours. If the drying temperature is too low or the drying time is too short, water will remain, whereby the flexural strength deteriorates and the shrinkage of the shaped product increases. On the other hand, if the drying temperature is too high or the drying time is too long, the shaped product will be hardened, whereby the toughness of the shaped product will be impaired.

The aqueous slurry used for the preparation of the shaped product of the present invention has excellent water-filtration characteristics, and when formed into a shaped product, the flexor strength of the shaped product will be excellent to such an extent that has not been attained before. As the reason for the improvement in the flexor strength, it is conceivable that the polymer latex added is three-dimensionally intertwined with calcium silicate to establish secure bonding, and partially, the carboxyl groups in the polymer latex and calcium ions of the calcium silicate bond to each other to enhance the bonding.

Further, it is considered that by the addition of the coupling agent, the bonding of the two materials is facilitated and strengthened, so that the shaped product of the present invention has remarkably improved flexural strength with a light weight and exhibits a high level of processability and water resistance substantially equal to wood material without losing the non-flammability of the calcium silicate.

Now, the present invention will be described in further detail with reference to Examples and Comparative Examples. However, it should be understood that the present invention is by no means restricted to such specific Examples.

In the Examples, the flexor strength of each shaped product was measured in accordance with JIS A-1408. The size of the test piece was 15 cm $\times$ 5 cm $\times$ 1.5 cm. The results are represented by an average value of three test pieces.

EXAMPLE 1

Warm water was added to 49.6 parts by weight of quick lime (96.2% of CaO) for slaking to obtain a slaked lime slurry, and to this slurry, 50.4 parts by weight of ground quartzite (96.4% of $SiO_2$) was added. Then, water was added to bring the total amount of water to be 27.5 times by weight relative to the solid content. This slurry was reacted for 4 hours under steam pressure of 15 kg/cm obtain a calcium silicate hydrate of xonotlite.

Relative to 100 parts by weight of the dried solid content of this calcium silicate hydrate, 7 parts by weight of a carboxyl-modified styrene-butadiene copolymer latex (Nipol 2570$\times$5, manufactured by Nippon Zeon Co., Ltd.), 0.5 part by weight of a silane coupling agent (A-189, manufactured by Nippon Yunika) and 3 parts by weight of a carbon fiber (3000 filaments having a length of 25 mm) as a fiber reinforcing material, were mixed to the slurry of the calcium silicate hydrate and thoroughly dispersed therein.

Then, this slurry was poured into a mold frame of 300mm$\times$300 mm, then filter-pressed for molding and dried at 120° C. for 10 hours. The shaped product thus obtained was subjected to tests. The results are shown in Table 1.

EXAMPLE 2

A shaped product was prepared in the same manner as in Example 1 except that the type of the coupling agent was changed to a titanate coupling agent (KR-138S, manufactured by Ajinomoto). The test results of the shaped product thus obtained are shown in Table 1.

EXAMPLE 3

A shaped product was prepared in the same manner as in Example 1 except that the amount of the coupling agent was increased to 1.0 part by weight. The test results of the shaped product thus obtained are shown in Table 1.

EXAMPLE 4

A shaped product was prepared in the same manner as in Example 1 except that the amount of the carbon fiber was increased to 6 parts by weight. The test results of the shaped product thus obtained are shown in Table 1.

EXAMPLE 5

A shaped product was prepared in the same manner as in Example 1 except that the amount of the carboxyl-modified styrene-butadiene polymer latex was reduced to 3 parts by weight as solid content. The test results of the shaped product thus obtained are shown in Table 1.

EXAMPLE 6

Warm water was added to 49.6 parts by weight of quick lime (96.2% of CaO) for slaking to obtain a slaked lime slurry, and to this slurry, 50.4 parts by weight of ground quartzite (96.4% of $SiO_2$) was added. Then, water was added to bring the total amount of water to be 27.5 times by weight relative to the solid content. This slurry was reacted for 2 hours under steam pressure of 15 kg/cm$^2$ to obtain a calcium silicate hydrate containing C-S-H(I) as the main component.

Relative to 100 parts by weight of the dried solid content of this calcium silicate hydrate, 7 parts by weight of a carboxyl-modified styrene-butadiene copolymer latex (Nipol 2570$\times$5, manufactured by Nippon Zeon Co., Ltd.), 0.5 part by weight of a silane coupling agent (A-189, manufactured by Nippon Yunika) and 3 parts by weight of a carbon fiber (3000 filaments having a length of 25 mm) as a fiber reinforcing material, were mixed to the slurry of the calcium silicate hydrate and thoroughly dispersed therein.

Then, this slurry was poured into a mold frame of 300 mm$\times$300 mm, then filter-pressed for molding, aged for 4 hours under a steam pressure of 10 kg/cm$^2$ and dried at 120° C. for 10 hours. The shaped product thus obtained was subjected to tests. The results are shown in Table 1.

COMPARATIVE EXAMPLE 1

A slurry of a calcium silicate hydrate obtained in the same manner as in Example 1, was poured directly to the mold frame, and the subsequent operation was conducted in the same manner as in Example 1 to obtain a shaped product. The test results of the shaped product thus obtained are shown in Table 1.

COMPARATIVE EXAMPLE 2

A shaped product was prepared in the same manner as in Example 1 except that 7 parts by weight of a styrene-butadiene copolymer latex (Nipol 2507, manufactured by Nippon Zeon Co., Ltd.) containing no carboxyl group was added as the polymer latex, and the coupling agent was not added. The test results of the shaped product thus obtained are shown in Table 1.

COMPARATIVE EXAMPLE 3

A shaped product was prepared in the same manner as in Example 1 except that the coupling agent was not added. The test results of the shaped product thus obtained are shown in Table 1.

COMPARATIVE EXAMPLE 4

A shaped product was prepared in the same manner as in Example 1 except that 3 parts by weight of a glass fiber was added and the coupling agent was not added. The test results of the shaped product thus obtained are shown in Table 1.

COMPARATIVE EXAMPLE 5

A shaped product was prepared in the same manner as in Example 1 except that the coupling agent and the fiber reinforcing material were not added. The test results of the shaped product thus obtained are shown in Table 1.

COMPARATIVE EXAMPLE 6

A shaped product was prepared in the same manner as in Example 1 except that 3 parts by weight of a glass fiber was added as the fiber reinforcing material The test results of the shaped product thus obtained are shown in Table 1.

COMPARATIVE EXAMPLE 7

A shaped product was prepared in the same manner as in Example 1 except that the fiber reinforcing material was not added. The test results of the shaped product thus obtained are shown in Table 1.

TABLE 1

|  | Materials (numerals: parts by weight) | | | | | | Bulk specific gravity ($g/cm^3$) | Flexural strength ($kg/cm^2$) |
| --- | --- | --- | --- | --- | --- | --- | --- | --- |
|  | Calcium silicate | Copolymer latex | Coupling agent | | Reinforcing fiber | | | |
| Example 1 | 100 | 7 | Silane | 0.5 | Carbon fiber | 3 | 0.55 | 140 |
| Example 2 | " | " | Titanate | 0.5 | " | " | 0.53 | 138 |
| Example 3 | " | " | Silane | 1.0 | " | " | 0.54 | 150 |
| Example 4 | " | " | Silane | 0.5 | " | 6 | 0.56 | 205 |
| Example 5 | " | 3 | " | " | " | 3 | 0.53 | 133 |
| Example 6 | " | 7 | " | " | " | " | 0.55 | 135 |
| Comparative Example 1 | 100 | — | — | | — | | 0.52 | 62 |
| Comparative Example 2 | " | 7* | — | | Carbon fiber | 3 | 0.54 | 111 |
| Comparative Example 3 | " | 7 | — | | " | " | 0.54 | 128 |
| Comparative Example 4 | " | 7 | — | | Glass fiber | " | 0.55 | 101 |
| Comparative Example 5 | " | 7 | — | | — | | 0.53 | 78 |
| Comparative Example 6 | " | " | Silane | 0.5 | Glass fiber | 3 | 0.55 | 116 |
| Comparative Example 7 | " | " | " | | — | | 0.54 | 96 |

*Latex of a styrene-butadiene copolymer containing no carboxyl group.

The calcium silicate shaped product of the present invention has a light weight and excellent flexural strength and is excellent in the non-flammability, heat resistance and water resistance. Not only that, it has excellent heat insulating and heat keeping properties, and it also has a moisture controlling function similar to wood material. Thus, the shaped product is useful as a building material which can be used as a substitute for wood material.

We claim:

1. A calcium silicate shaped product consisting essentially of a calcium silicate hydrate, a carboxyl group-containing copolymer latex, a coupling agent and a carbon fiber having a tensile strength of at least 150 kg/mm² and a tensile modulus of elasticity of at least 5 ton/mm².

2. The calcium silicate shaped product according to claim 1, wherein the carboxyl group-containing copolymer latex is in an amount of from 2 to 25 parts by weight, as solid content, relative to 100 parts by weight of the calcium silicate hydrate.

3. The calcium silicate shaped product according to claim 1, wherein the carboxyl group-containing copolymer latex is a latex of a styrene-butadiene copolymer, an acrylonitrile-butadiene copolymer or an acrylate copolymer.

4. The calcium silicate shaped product according to claim 1, wherein the carboxyl group-containing copolymer latex is a styrene-butadiene copolymer latex obtained by copolymerizing 100 parts by weight of a styrene-butadiene copolymer with from 0.2 to 20 parts by weight of a carboxyl group-containing unsaturated hydrocarbon.

5. The calcium silicate shaped product according to claim 1, wherein the carboxyl group-containing copolymer latex is a self-curing copolymer which contains, in addition to the carboxyl group, at least one type of functional group cross-linkable with the carboxyl group.

6. The calcium silicate shaped product according to claim 1, wherein the coupling agent is a silane coupling agent or a titanate coupling agent.

7. The calcium silicate shaped product according to claim 1, wherein the coupling agent is in an amount of from 0.3 to 5 parts by weight relative to 100 parts by weight of the calcium silicate hydrate.

8. The calcium silicate shaped product according to claim 1, wherein the carbon fiber is in an amount of from 1 to 15 parts by weight relative to 100 parts by weight of the calcium silicate hydrate.

* * * * *